US012810207B2

(12) United States Patent
Kamasamodram et al.

(10) Patent No.: US 12,810,207 B2
(45) Date of Patent: Nov. 24, 2026

(54) MACHINE-LEARNING THROUGH HYBRID COMPUTE

(71) Applicant: Microsoft Technology Licensing, LLC, Redmond, WA (US)

(72) Inventors: Ramesh Kamasamodram, Sammamish, WA (US); Gayathri Chandrasekaran, Seattle, WA (US); Jyoti Mathur, Bothell, WA (US); Jason Eric Voldseth, Campbell, CA (US); Ragavenderan Venkatesan, Mill Creek, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 564 days.

(21) Appl. No.: 18/476,107

(22) Filed: Sep. 27, 2023

(65) Prior Publication Data

US 2025/0103949 A1 Mar. 27, 2025

(51) Int. Cl.
*G06N 20/00* (2019.01)

(52) U.S. Cl.
CPC .................................... *G06N 20/00* (2019.01)

(58) Field of Classification Search
CPC .......................... G06F 16/90332; G06N 20/00
See application file for complete search history.

(56) References Cited

U.S. PATENT DOCUMENTS 10,749,989 B2 * 8/2020 Le ........................... G06F 9/547
10,901,791 B2 1/2021 Bartlett et al.
12,547,947 B2 * 2/2026 Knuesel ................. G06N 20/20
12,645,959 B2 * 6/2026 Le ............................ G06N 5/04
2016/0299979 A1 10/2016 Bawri et al.

(Continued)

FOREIGN PATENT DOCUMENTS

CN 102160043 A 8/2011

OTHER PUBLICATIONS

"Intent Matching", Retrieved From: https://cloud.google.com/dialogflow/es/docs/intents-matching, Retrieved From: Jun. 28, 2023, 3 Pages.

(Continued)

*Primary Examiner* — Kris E Mackes
(74) *Attorney, Agent, or Firm* — Shook Hardy & Bacon L.L.P.

(57) ABSTRACT

The technology described herein uses local computing resources, rather than remote resources (e.g., server based), to provide a result upon determining that the local resource is capable of providing the result with above a threshold quality. When a local machine-learning model is not capable of providing the result with above the threshold quality, then a remote machine-learning model may be used to provide the result. A goal of the technology is to select the most efficient resource to provide a result without significantly compromising the quality of the result. The technology described herein makes a series of determinations to identify one or more machine-learning model results that may be provided locally with or without hybrid resources. Different machine-learning model results may be provided using different hybrid workflows. In aspects, a remote result and a local result are generated and ranked by the client.

18 Claims, 7 Drawing Sheets

(56) References Cited

U.S. PATENT DOCUMENTS

| | | | | |
|---|---|---|---|---|
| 2017/0039269 | A1 | 2/2017 | Raff et al. | |
| 2022/0327130 | A1 | 10/2022 | Zhong et al. | |
| 2023/0169362 | A1* | 6/2023 | Beucher | G06N 3/096 706/12 |
| 2023/0316090 | A1* | 10/2023 | Chakraborty | G06F 9/54 706/15 |
| 2025/0373506 | A1* | 12/2025 | Yue | G06N 3/098 |

OTHER PUBLICATIONS

Urban, et al., "Intents", Retrieved From: https://learn.microsoft.com/en-us/azure/ai services/luis/concepts/intents, Jul. 18, 2023, 5 Pages.

Labidi, et al., "Towards an Automatic Intention Recognition from Client Request", In Proceedings of International Conference on Computational Collective Intelligence, Sep. 20, 2016, pp. 163-172.

International Search Report Received in PCT Application No. PCT/US2024/043788, mailed on Dec. 2, 2024, 12 pages.

International Preliminary Report on Patentability Chapter 1 Received in PCT Application No. PCT/US2024/043788, mailed on Apr. 9, 2026, 07 pages.

* cited by examiner

MACHINE-LEARNING THROUGH HYBRID COMPUTE

BACKGROUND

Applications, such as browsers, email clients, document editors and others provide various services to users. These services can include query suggestion and composition assistance that use data sources, such as knowledge graphs. The knowledge graphs and service providers are often operated in remote data centers, rather than on the client. Use of these remote services require user input and context information to be communicated over a network to the remote service provider. A result is then generated by the remote service and communicated back to the client.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein uses local computing resources, rather than remote resources (e.g., server based), to provide a result upon determining that the local resource is capable of providing the result with above a threshold quality. When a local machine-learning model is not capable of providing the result with above the threshold quality, then a remote machine-learning model may be used to provide the result. Accordingly, the technology described herein may use a combination of local and remote resources to produce a final result. A goal of the technology is to select the most efficient resource to provide a result without significantly compromising the quality of the result. In general, using a local machine-learning model is more efficient and reduces user-perceived latency. Using local resources avoids communication of data, such as user input and application context, over a network to a remote machine-learning model.

The technology described herein may build a local, user-specific entity index to provide information to the local machine-learning models. In aspects, a remote system may build a knowledge graph that includes entities a user interacts with. The entities can include contacts and associated contact information (e.g., phone, email, address, etc.), files, meetings, and the like. The technology described herein may build a local index that describes all or a subset of these entities. In one aspect, a subset of entities is maintained in the local index based on various factors, such as frequency and recency of user interaction with the entity.

The technology described herein makes a series of determinations to identify one or more results that may be provided locally with or without hybrid resources. The first determination may be made by a scenario router, which may evaluate user input and application context to trigger initiation of a local machine-learning model process. In some instances, a context dependent heuristic is used to determine that a local result may be provided. Other scenarios use a more complex method of identification. For example, intent detection may be performed to determine that an entity lookup should be performed. The intent detection model uses a local machine-learning model to determine whether a local composition assistance service, such as entity lookup, should be initiated. The intent model may generate various user intents and associated confidence measures. The user intent may describe a category of text the user intends to type next. One or more of the intents or intent classes (e.g., a noun or named entity) may trigger initiation of the local machine-learning model process.

Different machine-learning model results may be provided using different hybrid workflows. Hybrid workflows can differ depending on the process steps involved and whether the step may be performed on both local and remote machine-learning models. Generally, the hybrid workflow starts with the local machine-learning model generating a local result and a quality measure for the local result. The quality measure is compared to a quality threshold to determine whether remote resources are contacted to generate an alternative remote result. In one aspect, the quality measure is a confidence factor output by a machine-learning model used to generate the local output. If the quality threshold is satisfied, meaning the quality measure indicates that a quality standard indicated by the quality threshold is met, then remote resources are not called. If the quality threshold is not met, then the input is communicated to a remote resource and the remote machine-learning model generates a remote result and a remote result measure.

The remote result and remote result measure are then communicated to the local hybrid compute system. The respective measures are used to rank the local result and the remote result to generate a final result (e.g., the highest ranked result, if different results are provided). The final result may be output to the user through the user interface. In aspects, the ranking of server provided results and local results are ranked entirely using a local ranking model.

BRIEF DESCRIPTION OF THE DRAWINGS

The technology described herein is described in detail below with reference to the attached drawing figures, wherein.

DETAILED DESCRIPTION

Figure 1:
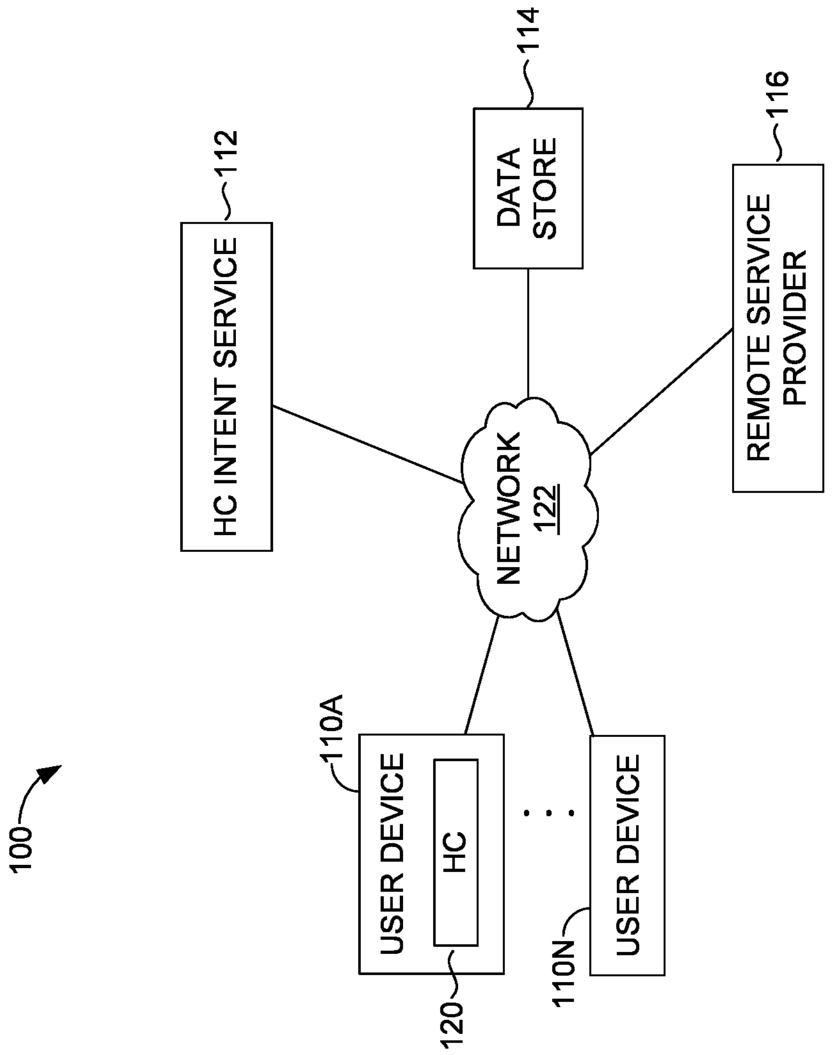
FIG. 1 is a block diagram of an example hybrid compute machine-learning system, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

The technology described herein uses local computing resources, rather than remote resources (e.g., server based), to provide a result upon determining that the local resource is capable of providing the result with above a threshold quality. When a local machine-learning model is not capable of providing the result with above the threshold quality, then a remote machine-learning model may be used to provide the result. Accordingly, the technology described herein may use a combination of local and remote resources to produce a final result. A goal of the technology is to select the most efficient resource to provide a result without significantly compromising the quality of the result. In general, using a local machine-learning model is more efficient and reduces user-perceived latency. Using local resources avoids communication of data, such as user input and application context, over a network to a remote machine-learning model.

On the other hand, server-based machine-learning models may provide a higher quality service in some contexts. Server-based machine-learning models may have access to more computing power capable of supporting larger and more powerful machine-learning models. Server-based services may also have access to more data resources, such as web indexes, the entirety of large knowledge bases, and tenant data (e.g., enterprise data). The use of larger and more complex models and access to additional data can improve the quality of service. However, the use of larger machine-learning model and knowledge bases may also use more electricity and computing capacity than local models.

The technology described herein may build a local, user-specific entity index to provide information to the local machine-learning models. In aspects, a remote system may build a knowledge graph that includes entities a user interacts with. The entities can include contacts and associated contact information (e.g., phone, email, address, etc.), files, meetings, and the like. The technology described herein may build a local index that includes all or a subset of these entities. In one aspect, a subset of entities is maintained in the local index based on various factors, such as frequency and recency of user interaction with the entity. In one aspect, the local machine-learning model retrieves an entity from the user entity index. For example, when a user types a letter in the "to:" box of an email application, the local machine-learning model may suggest email addresses from the user's contact list that start with the letter or include the provided letter.

The technology described herein may be used with a remote application or remote service. Example remote applications can include a remote email application, remote calendar application, remote social media application, remote document editing application, remote enterprise application. These remote applications may be run using server computing resources that are accessed through a browser or other application running on the client computing device. In this implementation, the remote application may coordinate with the browser or other application to provide the result locally by installing the machine-learning model that provides the local result on the client device. In one example, the machine-learning model that provides the result runs in the local browser application. This arrangement differs from current practices employed by remote applications, which provide the machine-learning services using server resources exclusively.

The technology described herein makes a series of determinations to identify one or more machine-learning model results that may be provided locally and/or with hybrid resources. Other services may be provided remotely, apart from the technology described herein. The first determination may be made by a scenario router, which may evaluate user input and application context to trigger initiation of a local machine-learning model process. In some instances, a context dependent heuristic is used to determine that a local machine-learning model is capable of providing relevant result. In one example, the heuristic considers a type of user input and user interface feature into which the user input is provided. When the type of input and interface feature match the heuristic criteria, then the workflow is triggered. For example, the user input of typing a single letter (or just clicking) into the query box, email address box (e.g., to, cc, bcc), phone number box (e.g., in a texting application) or the other interface feature may be used to determine an entity lookup service should be initiated. The entity lookup service is an example of a machine-learning model result that can be provided locally by the technology described herein.

Other scenarios use a more complex method of identification. For example, the technology described herein may provide composition assistance. Composition assistance attempts to predict a word or phrase the user will type or is in the midst of typing. The predicted word or phrase is then provided to the user for adoption and added to the text, when adopted. Some applications provide a shortcut the user can type, such as "/" to explicitly request an entity lookup. In an example, entity lookup is a type of composition assistance where the missing word or phrase is an entity (e.g., phone number, email address, file name, contact name). In this example, the scenario router may use the shortcut to determine entity lookup should be initiated.

In another example, input text is routed to a local intent detection model. The intent detection model uses a local machine-learning model to determine whether a local composition assistance service, such as entity lookup, should be initiated. The intent model may generate various user intents and associated confidence measures. The user intent may describe a category of text the user intends to type next. One or more of the intents or intent classes (e.g., a noun or named entity) may trigger initiation of the local service. In an aspect, user input that is not associated with a local intent may be sent to the remote service for additional intent detection. The remote service may identify a remote intent associated with a result a local machine-learning model is able to provide. In this case, the remotely determined intent may be used to initiate the local provision of the machine-learning model result. Additionally or alternatively, a remote machine-learning model may provide a remote result.

Different machine-learning model results may be provided using different hybrid workflows. Hybrid workflows can differ depending on the process steps involved and whether the step may be performed on both local and remote machine-learning models. Generally, the hybrid workflow starts with the local machine-learning model generating a local result and a quality measure for the local result. The measure is compared to a quality threshold to determine whether remote resources are contacted to generate an alternative remote result. The measure and threshold are both quality measures. In one aspect, the measure is a confidence factor output by a machine-learning model used to generate the local output. If the threshold is satisfied, meaning the measure indicates that a quality standard indicated by the threshold is met, then remote resources are not called. If the threshold is not met, then the input is communicated to a remote resource and the remote machine-learning model generates a remote result and a remote result measure.

The remote result and remote result measure are then communicated to the hybrid compute system. The respective measures are used to rank the local result and the remote result to generate a final result (e.g., the highest ranked result, if different results are provided). The final result may be output to the user through the user interface. In aspects, the ranking of server provided results and local results are ranked entirely using a local ranking model.

Machine-learning based services can include automatic query completion, search result suggestions, entity look up and composition assistance. Automatic query completion suggests one or more full queries to a user based on an incomplete query provided by a user. The incomplete query may include a single character, multiple characters, a single word, and/or multiple words. The suggested query includes missing words and characters to form a full query. Search suggestions include results (?) provided based on a partial query or no query, such as when the user selects the query box.

Accordingly, the technology described herein is directed to facilitating the generation, provision, and utilization of machine-learning model results in an efficient and effective manner. Advantageously, efficiencies of computing and network resources may be enhanced using implementations described herein. In particular, the technology described herein provides for a more efficient use of computing resources (e.g., less packet generation costs and reduced I/O by using local resources) than conventional methods of search and/or machine learning experiences. For instance, the technology described herein enables a query recommendation to be generated without remote resources. This eliminates data transfer between the local computing system and remote systems. The reduced data transfer can also reduce latency.

In an example, as used herein, "local" means resources integrated with a computing device or in physical proximity and directly connected through a wired or wireless connection.

In an example, as used herein, "remote" means connected via a network connection. In one aspect, remote computing resources run in a server within a data center. The remote resources may be used by a tenant, such as a company, school, partnership, government body, or other enterprise.

In an example, as used herein, machine-learning models are computer programs that are used to recognize patterns in data or make predictions. They are created from machine learning algorithms, which are trained using either labeled, unlabeled, or mixed data. Machine learning is a subfield of artificial intelligence (AI) that uses algorithms trained on data sets to create models that enable machines to perform tasks, such as determining user intent, analyzing data, or predicting text.

The machine-learning models used herein may be trained using supervised methods, unsupervised methods, semi-supervised methods, reinforcement learning methods and ensemble methods. The supervised learning models that may be used include, but are not limited to, linear regression models, logistic regression models, decision trees, random forest, gradient boosting algorithm models, support vector machines (SVM), nearest neighbors models, and neural networks. The unsupervised learning models include, but are not limited to, clustering (K-Means, Hierarchical Cluster Analysis) models, association rules (Apriori, Eclat), principal component analysis (PCA) models, singular value decomposition (SVD) models, independent component analysis (ICA) models, and autoencoder models. The Semi-Supervised Learning models include, but are not limited to, generative models, low-density separation models, graph-based methods and heuristic approaches. The reinforcement learning models includes Q-learning, State-Action-Reward-State-Action (SARSA), and Deep Q Network (DQN). The ensemble models include bagging, boosting, and stacking models. Each of these models has its own strengths and weaknesses, and is used in various different scenarios depending on the nature of the data and the problem being solved.

Overview of Example Environments for Facilitating Generation of Task Insights Referring initially to FIG. 1, a block diagram of an example network environment 100 suitable for use in implementing embodiments described herein is shown. Generally, the network environment 100 illustrates an environment suitable for implementing hybrid compute machine-learning models.

The network environment 100 includes a user device 110A-110N (referred to generally as user device(s) 110), a hybrid compute service 112, a data store 114, and remote service provider 116. The user devices 110A-110N, the hybrid compute service 112, the data store 114, and the remote service provider 116 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the example network environment 100 be interpreted as having any dependency or requirement related to any single component or combination of components illustrated therein. For example, the user devices 110A-110N may be in communication with the hybrid compute service 112 via a mobile network or the Internet, and the hybrid compute service 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the hybrid compute service 112 and/or data store 114 may be integrated with the remote service providers 116.

The user device 110 may be any kind of computing device capable of facilitating and/or providing machine-learning insights to a user. For example, in an embodiment, the user device 110 may be a computing device such as computing device 700, as described above with reference to FIG. 8. In embodiments, the user device 110 may be a personal computer (PC), a laptop computer, a workstation, a mobile computing device, a PDA, a cell phone, or the like.

The user device may include one or more processors, and one or more computer-readable media. The computer-readable media may include computer-readable instructions executable by the one or more processors. The instructions may be embodied by one or more applications, such as hybrid compute system 120 shown in FIG. 1. The application(s) may generally be any application capable of facilitating, determining and/or providing machine-learning insights to the user. In some implementations, the application(s) comprises a web application, which may run in a web browser, and could be hosted at least partially server-side (e.g., via a Microsoft® Office 365). In addition, or instead, the application(s) may comprise a dedicated application. In some cases, the application is integrated into the operating system (e.g., as a service). As one specific example application, the hybrid compute system 120 may be a tool integrated with a browser that provides machine-learning outputs, such as a query suggestion, entity look up, search, and composition assistance.

User device 110 may be a client device on a client-side of network environment 100, while hybrid compute service 112 and remote service 116 may be on a server-side of network environment 100. Hybrid compute service 112 and/or remote service 116 may comprise server-side software designed to work in conjunction with client-side software on user device 110 so as to implement any combination of the features and functionalities discussed in the present disclosure. An example of such client-side software is hybrid compute system 120 on user device 110. This division of operating environment 100 is provided to illustrate one example of a suitable environment, and it is noted there is no requirement for each implementation that any combination of hybrid compute service 112, data source 114, and/or remote service 116 to remain as separate entities. The hybrid compute service 112 may be implemented as server systems, program modules, virtual machines, components of a server or servers, networks, and the like.

Figure 2:
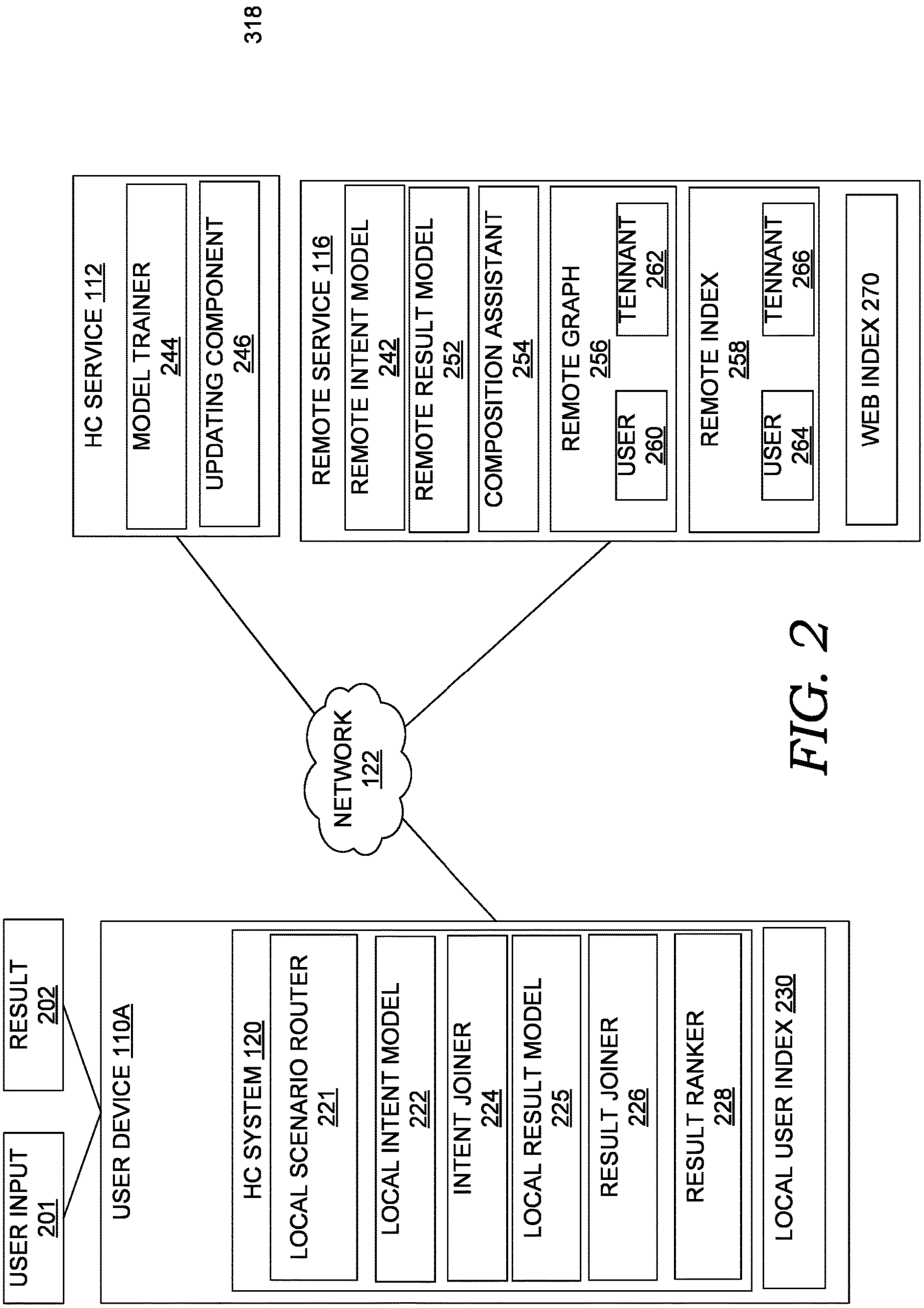
FIG. 2 is an example hybrid compute machine-learning system with intent detection, in accordance with aspects of the technology described herein.

Turning now to FIG. 2, an example computing system 200 for hybrid service is provided, in accordance with aspects of the technology described herein. These components, functions performed by these components, or services carried out by these components are implemented at appropriate abstraction layer(s) such as the operating system layer, application layer, and/or hardware layer of the computing system(s). Alternatively, or in addition, in some embodiments, the functionality of these components and/or the embodiments described herein are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 200, it is contemplated that in some embodiments functionality of these components are shared or distributed across other components.

The user device 110A includes the hybrid compute (HC) system 120, the local user index 230, and the local scenario router 221. The HC system 120 includes a local scenario router 221, a local intent model 222, an intent joiner 224, a local result model 225, a result joiner 226, and a result ranker 228. At a high level, the HC system 120 receives a user input 201 and produces a result 202 that may be presented to the user. In aspects, the various machine learning models may use the Open Neural Network Exchange ("ONNX") format. ONNX is an open format built to represent machine learning models. ONNX defines a common set of operators—the building blocks of machine learning and deep learning models—and a common file format to enable AI developers to use models with a variety of frameworks, tools, runtimes, and compilers. Using a common format allows the output of one model to be used as input to another model with less or no format conversion.

The local user index 230 is a data structure that helps machine learning models search for entities and relationships within a knowledge graph. The local user index 230 may represent data from the user's graph 260. The data structure may take the form of a reverse lookup index. The data structure will include characteristics for each entity represented in the index. The characteristics may be a subset of characteristics found in the graph. In aspects, the characteristics selected for the index are those most likely to be a usable signal for the machine-learning model evaluating the entities in the index. The local user index 230 may be periodically updated (e.g., hourly, daily) by the updating component 246, such that the local user index 230 and the remote user index 262 include the same information immediately after the update.

Figure 3:
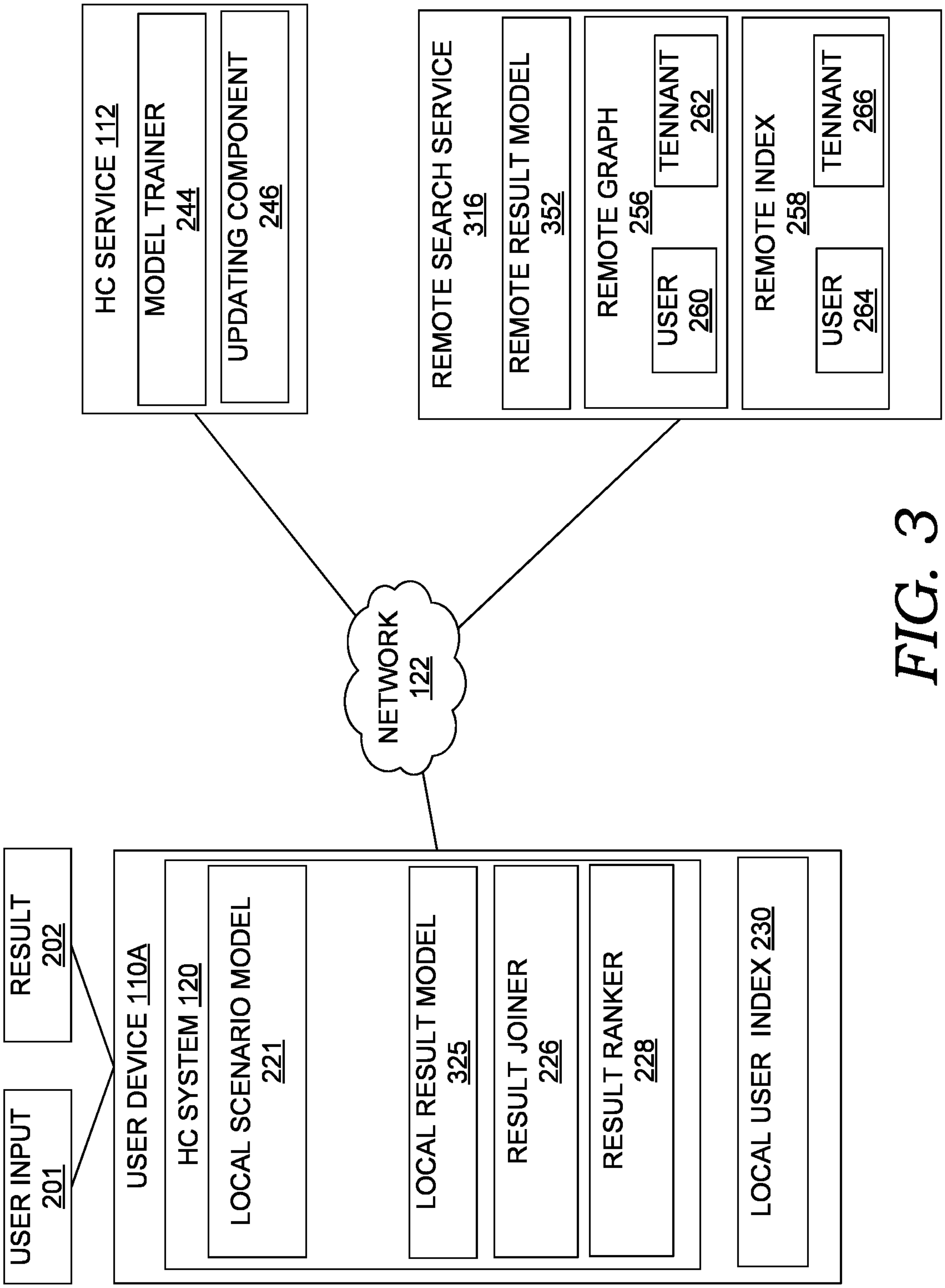
FIG. 3 example hybrid compute machine-learning system without intent detection, in accordance with aspects of the technology described herein.

The local scenario router 221 determines when a machine-learning workflow should be initiated and which workflow should be initiated. For the sake of simplicity, the workflows may fall into two categories. The first category involves determining a user intent. When certain intents are detected a corresponding workflow is initiated. The first category involves workflows where a user need for the result is indirectly inferred from context. The first category is described in FIG. 2. The second category does not involve user intent and is described in more detail with reference to FIG. 3. Many of the system components in FIGS. 2 and 3 are the same or similar.

A scenario router 221 evaluates user input and application context to trigger initiation of a local machine-learning model workflow. In some instances, a context dependent heuristic is used to determine that a local machine-learning model is capable of providing relevant result. In one example, the heuristic considers a type of user input and user interface feature into which the user input is provided. When the type of input and interface feature match the heuristic criteria, then a corresponding workflow is triggered. Different heuristics may be provided for different workflows. For example, the user input of typing a single letter (or just clicking) into the query box, email address box (e.g., to, cc, bcc), phone number box (e.g., in a texting application) or the other interface feature may be used to determine an entity lookup service should be initiated. The different boxes (e.g., interface context) can trigger different workflows. Inputting text to the email address bar can trigger an email address look up work flow. Inputting text to the search box can trigger a search suggestion workflow or query suggestion workflow. The context dependent heuristics do not require intent detection.

Other scenarios use a more complex method of identification. For example, the technology described herein may provide composition assistance. Composition assistance attempts to predict a word or phrase the user will type or is in the midst of typing. The predicted word or phrase is then provided to the user for adoption and added to the text, when adopted. Some applications provide a shortcut the user can type, such as "/" to explicitly request an entity lookup. Entity lookup is a type of composition assistance where the missing word or phrase is an entity (e.g., phone number, email address, file name, contact name). In this example, the scenario router may use the shortcut to determine entity lookup should be initiated. The entity lookup workflow may then be triggered.

The scenario router 221 may initiate an intent detection workflow when text composition is occurring. Text composition may be detected based on the portion of a user interface into which text is being input. When text composition is detected, then an intent detection workflow may be initiated, which uses the local intent model 222.

The local intent model 222 determines a user intent given a textual input and/or a context of a user interface. The context can include other text added, the title of a document being edited, characteristics (e.g., addressees) of an email being written, characteristics (e.g., time, date, location, invitees, title) of a meeting invite being written. In the context of autocomplete, intent detection plays a crucial role in understanding the user's intention behind their input and predicting the most likely next action or query. By analyzing the user's partial input, autocomplete systems can classify their intent and provide relevant suggestions or completions. This helps users save time and effort by reducing the need to type out complete queries or actions. The intent can be an input to the machine-learning model that generates the result.

In aspects, the intent may be expressed as a query. For example, if the user provides the textual input, "please give me a call this afternoon. My number is" then an intent to type the user's phone number may be determined by the intent model 222. The intent could be expressed in the form of a query that can be processed by the local result model 225. For example, the query could be "user phone number." The local result model could provide a cell phone number, work number, and home phone number associated with the user writing the textual input. The result ranker 228 could then rank the various response and select a final input.

The intent joiner 224 may determine whether a remote intent detection should be requested and then select between one or more remote intents and one or more local intents to select a final intent. In one aspect, a remote intent is requested when a local intent is associated with a quality measure falling outside of a desired quality threshold. The quality measure associated with the local intent and the remote intent may be used to select the final intent. In an aspect, the intent associated with the quality measure indicating the highest quality is selected. The quality measure may be a confidence score or other output of the intent model.

The local result model 225 is a machine learning model that generates the final result. The final result can include multiple results. The user may then choose on or more of the multiple results. In one aspect, the local result model 225 receives the intent as input (possibly in the form of a query) and generates a result. The local result model 225 may also receive the textual input and application or user interface context as input data. The user interface context can include other text or content from the user interface. In this example, the local result model 225 may suggest an entity that is consistent with the intent, such as the user's phone number. The local result model 225 may interact with the local user index 230 to select the result. The local result model 225 may output the result with a quality measure, such as a confidence score.

The result joiner 226 may determine whether a remote result should be requested and then select between one or more remote results and one or more local results to select a final result. In one aspect, a remote result is requested when a local result is associated with a quality measure falling outside of a desired quality threshold. The quality measure associated with the local result and the remote result may be used to select the final result. The quality measure may be a confidence score or other output of the result model.

The result joiner 226 can include business rules used to determine output characteristics. The output characteristics can include a type of output to be produced based on an identified scenario, such as an email address, file, calendar, or phone number. Accordingly, the business rule can include a defined scenario based on an input context, application context, and the like along with a corresponding output format. Once the result joiner 226 identifies a scenario a corresponding output format may be retrieved. One output format is a single result of a single type (e.g., email, email address, file, phone number, meeting record). This could be the result with the highest quality score. Another output format is multiple results of a single type. This could be a group with the highest quality score. Yet another output format is multiple outputs of different types. This could be the result of each different type with the highest quality score.

As an example business rule, the autocomplete scenario may be initiated when a user provides a textual input within in an email address box. The autocomplete scenario calls for an output of a single type (email address), but, optionally, multiple results of the same type could be provided. For example, the user may be given multiple email addresses starting with the textual input (e.g., single letter) to choose from.

When the result format calls for multiple results, the result joiner 226 may request a remote result when the local results are less than a threshold amount of results. For example, it may be determined that five or more email addresses should be provided in an email address autocomplete scenario even though only one is ultimately selected. If the local result includes three email addresses, then a remote result may be sought. The remote result could include additional email addresses from the enterprise graph/index that are not in the local graph. The remote and local results could then be combined and presented. In aspects, the local results are presented as soon as available to avoid user-perceived latency. The top remote results could then be added upon receipt.

As another example, the auto-search scenario may be initiated by a user typing in a query box. In this example, multiple results of different types may be presented according to the business rule. The local system may return results of one or more types, but be missing one or more other types. Results from the missing types could be sought from the remote system For example, the local system may return quality email address, contact and file results. However, if the business rule specifies that meeting records be output in the auto-search scenario and none were found locally (or none meeting a quality threshold are found), then relevant meeting records could be provided by the remote result generator. The remote results would then be joined with the local results.

The result ranker 228 assigns a relevance rank to a result provided by the local result model 225 and or the remote result model 228. The result ranker 228 may assign a relevance rank when multiple results are generated. For example, in response to a search result suggestion workflow, which suggests a search result before a query is submitted, multiple results may be returned by the local result model 225. Similarly, an email address suggestion workflow may return multiple results. The relevance rank can be used to select the final group to display and provide an order for the results.

The result ranker 228 can take different forms, but in one implementation it is a machine learning model. The result ranker 228 can be a decision tree model, neural network, or some other model. The ranking model will take the results as an input and output a relevance score. The model is trained using a loss function and training strategy. The training input may be sample results and a label.

In one example, a pointwise training strategy is used. The pointwise approach uses training data with an assigned relevance score, which represents the ground truth. In the pointwise approach, the loss directly measures the distance between a ground truth score on the training data and a predicted score. The training occurs by solving a regression problem, such as mean square error.

In another example, a pairwise method is used for training. The ground truth used is which input is more relevant than the other. The ground truth is compared against the prediction as a binary classification task. Other approaches are possible, such as a listwise approach The hybrid compute service 112 includes a model trainer 244 and an updating component 246. The remote service 116 includes a remote intent model 242, an entity lookup model 252, a composition model 254, a remote graph 256 (with user graph 260 and tenant graph 262) and a remote index 258 (with user index 264 and tenant index 266).

The model trainer 244 trains the various models using remote resources. The local machine learning models are then communicated to the client device 110 and stored for use. The model trainer 224 may periodically update various models as new data is received.

The updating component 246 updates the models on the client device 110 with new models and also updates the local user index 230 by adding and removing content.

The remote intent model 242 may be similar to the local intent model 222, except that it is trained to return additional intents related to tenant data or even web data. For example, given the textual input, "I would like to review the project plan. Can you, me and J . . . " the remote intent model recognizes that the name of a person starting with "J" is intended. The remote intent model 242 could suggest John Doe, because John Doe is on the same team as the person providing the textual input. For an example of web data, given the textual input, "I would like to see the penguin exhibit. We should go to the Kansas City," the remote intent model may recognize an intent for information about the Kansas City Zoo. This would allow the zoo address, open dates and times, and other information to be suggested by the remote result model 252. This information would be taken from the web index 270. Additional intents related to tenant data may also be detected by the remote intent model 242. Thus, the remote intent model 242 may have more robustness (able to detect more types of intent) than the local intent model 222.

The remote result model 252 is a machine learning model trained to produce results given an intent. In addition to the user data, the remote result model 252 may draw on tenant data and even web data to generate a result. The remote result model 252 may also receive the textual input and application or user interface context as input data. The user interface context can include other text or content from the user interface.

The composition model 254 is an example of a machine-learning model that performs a function not performed by a local model. The composition model may be a large language model (LLM) or other model that suggests text to the user. For example, when the user is drafting an email and types "kind" the composition model 254 may suggest, "regards." Note that regards is not an entity and would not be stored in the remote index 258 or local user index 260. In another example, the composition model 254 could predict enterprise information found in an enterprise index, but not a local personal index. For example, given the textual input, "The Parson project is due on Monday. Is the c . . . " the composition model 254 could identify a cost estimate file associated with the Parson Project as a relevant entity and suggest the file "cost_estimate_Parson.xls." If adopted, the completed sentence could state, "Is the cost_estimate_Parson.xls file ready to send?" The inclusion of the composition model 254 illustrates that some machine-learning functions may be provided by the remote environment, while other functions are performed locally. The remote intent model 242 may be trained to detect when composition assistance may be about to generate a useful result. This type of intent may be returned to the intent-join model and used to determine that the local result model will not be able to provide a relevant result. The local intent model 232 may be trained to only recognize intents for entities that can be selected by the local result model.

The remote graph 256 (with user graph 260 and tenant graph 262) is a knowledge graph including information about the user and the tenant the user is associated with. The remote graph is stored in a data center. The remote graph may be a single graph with an attribute that allows information in the graph to be associated with a user. A portion of information in the graph may have an attribute associated with the user of the client device 110. This information may be described as the user graph 260. The rest of the information that is not directly associated with the user may be described as the tenant graph 262 or enterprise data.

Various technologies have been developed in an effort to facilitate surfacing relevant information for a user. For example, a data feed service (e.g., Microsoft® My feed) can provide a combination of content (e.g., from across applications) based on what is likely to be most relevant to the particular user at the particular time. Generally, a data feed service may include content that has been shared with the user or content to which the user has access. For example, a data feed service may present a user with various documents, emails, email addresses, upcoming meetings, or the like, that are deemed relevant to the user. In one embodiment, a user's items, or activities associated therewith (e.g., receiving, accessing, sending, creating, modifying, deleting, viewing, attending, organizing, setting, monitoring, etc.), the people associated with the items, and the content associated with the activities are automatically inferred or detected based on the channels of collaboration associated with the activities, such as electronic mail, instant messages, documents, meetings, and the like. For instance, artificial intelligence or one or more machine learning mechanisms (e.g., models, algorithms, or applications) are used to infer the user's items, the people associated with the items, and the content associated with the items. This information may be associated with the user in the use graph 260.

In an example, a knowledge graph is a representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. In an example, a vertex is a point where one or more edges meet. In an example, an edge connects two vertices. Specifically, an entity may be represented as a vertex. In one aspect, the user is a vertex and is connected to other user's (e.g., contacts) through observed interactions, such as email messages, calls, or meetings. Users could be connected to when both access the same document, which is a different type of entity that may also be a vertex.

The remote index 258 (with user index 264 and tenant index 266) is a data structure that facilitates search for a portion of the graph. The data structure may take the form of a reverse lookup index. The data structure will include characteristics for each entity represented in the index. The characteristics may be a subset of characteristics found in the graph. In aspects, the characteristics selected for the index are those most likely to be a usable signal for the machine-learning model evaluating the entities in the index. The user index 264 is limited to information about the user of the computing device 110. The tenant index 266 includes information about tenant associated with the user of the user device 110.

Turning now to FIG. 3, an example computing system 300 for hybrid service is provided, in accordance with aspects of the technology described herein. These components, functions performed by these components, or services carried out by these components are implemented at appropriate abstraction layer(s) such as the operating system layer, application layer, and/or hardware layer of the computing system(s). Alternatively, or in addition, in some embodiments, the functionality of these components and/or the embodiments described herein are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 200, it is contemplated that in some embodiments functionality of these components are shared or distributed across other components.

The components of FIGS. 2 and 3 are similar, with a few exceptions. First, the system 300 of FIG. 3 does not determine intent. The system 300 may be used in scenarios that do not use intent. Accordingly, the remote service 316 does not include a remote intent detector. Also, the remote result model 352 is different. The remote result model 352 receives the textual input 201 as input, rather than an intent. An application context/user interface may also be provide as an input. Similarly, the local result model 325 receives the textual input as input, rather than an intent. The application context/user interface context may also be provided as an input.

Figure 4:
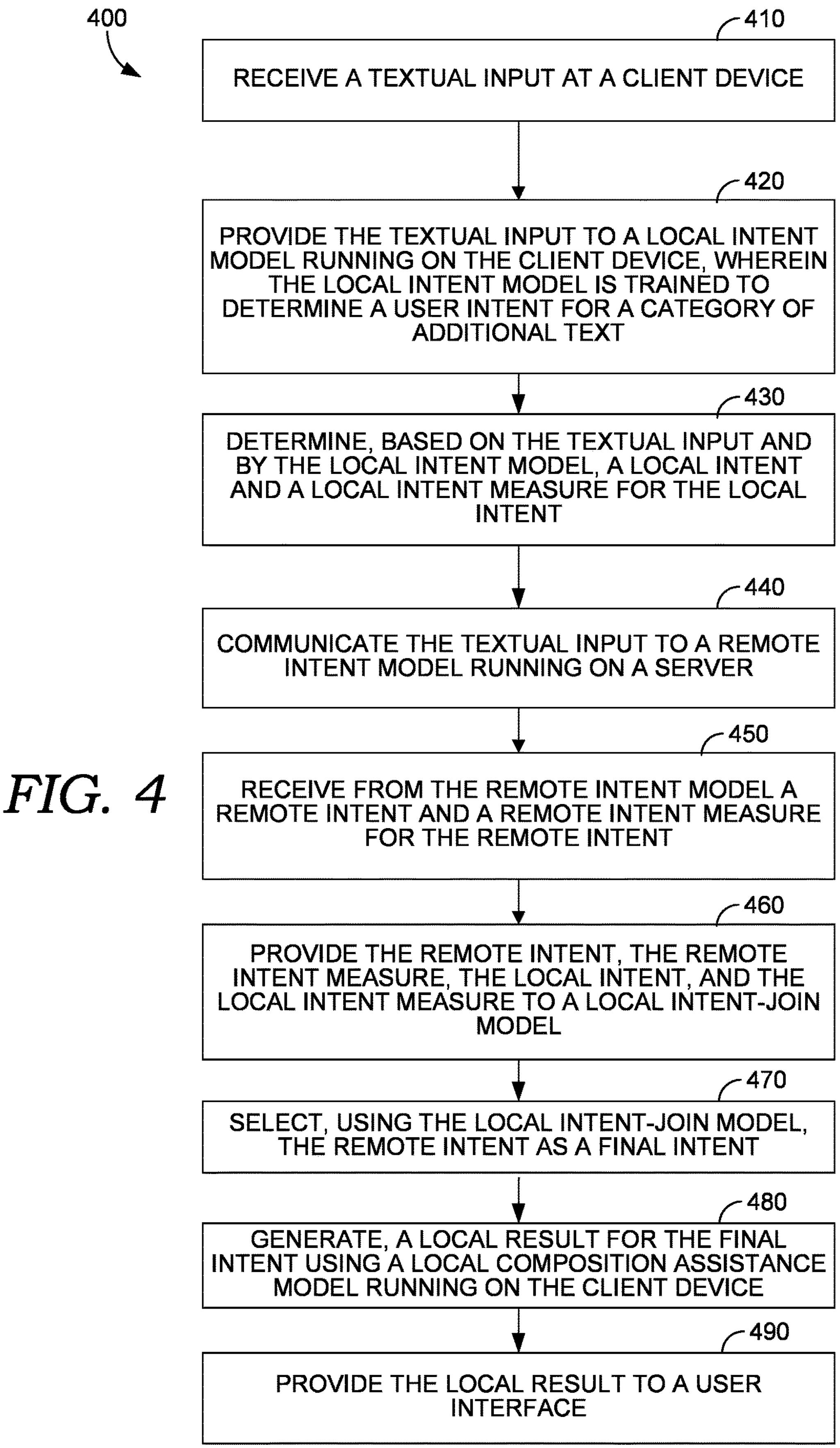
FIG. 4 provides a first example method for generating a result using local and remote resources, in accordance with aspects of the technology described herein.
Figure 5:
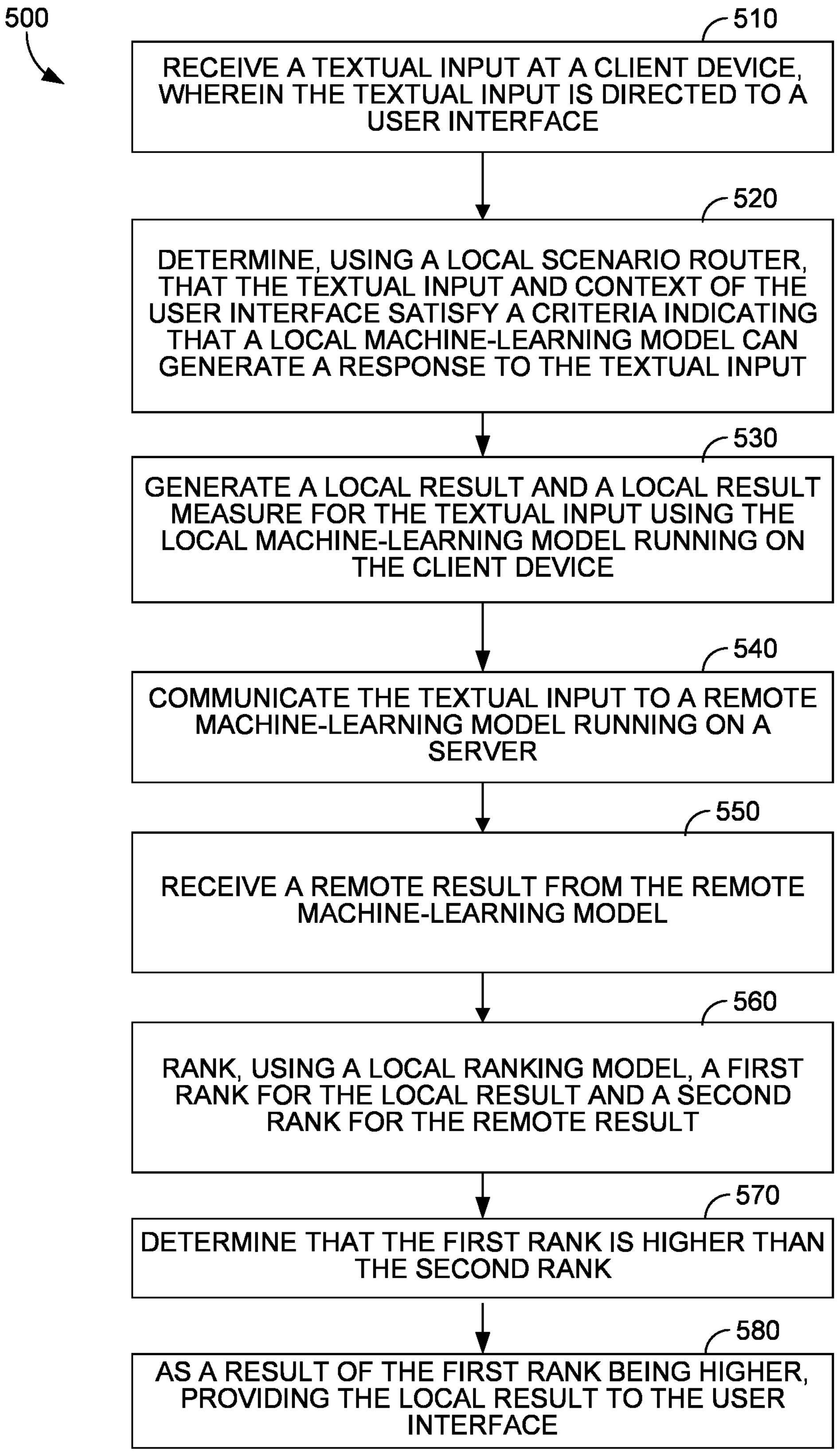
FIG. 5 provides a first example method for generating a result using local and remote resources, in accordance with aspects of the technology described herein.
Figure 6:
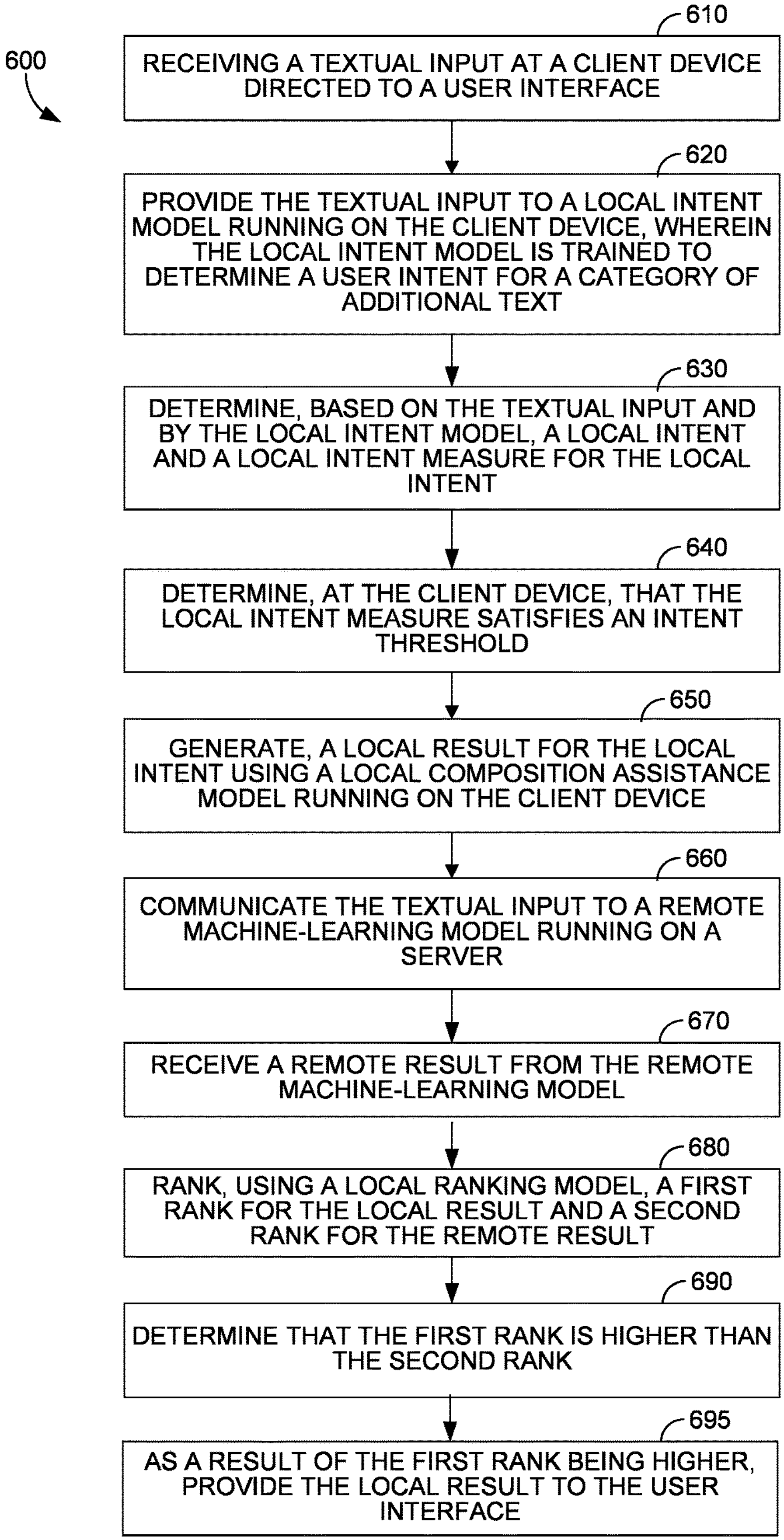
FIG. 6 provides a first example method for generating a result using local and remote resources, in accordance with aspects of the technology described herein.

As described, various implementations can be used in accordance with embodiments described herein. FIGS. 4-6 provide methods of generating results using local and remote resources, in accordance with embodiments described herein. The methods 400, 500, and 600 can be performed by a computer device, such as device 700 described below. The flow diagrams represented in FIGS. 4-6 are intended to be examples and not limiting.

Turning initially to FIG. 4, a method 400 of generating results using local and remote resources is provided. At step 410, method 400 includes receiving a textual input at a client device. The textual input may be provided through a keyboard associated with the client device. The keyboard or other source of the textual input, such as a microphone, if the textual input results from a speech-to-text system, is local to the client device. The keyboard may be integrated with the client device, such is typically the case with a laptop keyboard or virtual keyboard on a phone or tablet. If not integrated, the keyboard could be connected to the client device through a wired or wireless connection, as is often the case with a desktop computer. The textual input is not provided over a network.

The textual input is provided to a user interface of an active application. The application context can include the state of the interface and/or the application. The application could be a local application running on the client or a remote application running on a server. In the case of a remote application, a client application, such as a browser, may generate the user interface.

At step 420, method 400 includes providing the textual input to a local intent model running on the client device. The local intent model is trained to determine a user intent for a category of additional text. The local intent model may be trained remotely and then communicated to the client device, as described previously. At step 430, method 400 includes determining, based on the textual input and by the local intent model, a local intent and a local intent measure for the local intent.

At step 440, method 400 includes communicating the textual input to a remote intent model running on a server. The textual input may be communicated to the remote intent model in response to determining that a local quality measure for the local intent does not satisfy a quality threshold. Had the local quality measure satisfied the quality threshold, then a remote intent may not have been sought. At step 450, method 400 includes receiving from the remote intent model a remote intent and a remote intent measure for the remote intent. While the remote and local intent models both determine and intent, the models may be different and have access to different data sets. In aspects, the remote model has access to tenant entity data and/or web data, while the local model only has access to the user entity data. The remote and local intent models may use the same or different architecture. Because the remote and local models have access to different types of data, the training data provided to the two models may be different. The local model may be trained using synthetic text training data with an intent label limited to categories of user entity data. In contrast, the remote model may be trained with broader training data that includes labels for additional intents that don't correspond to intents in the user entity index.

At step 460, method 400 includes providing the remote intent, the remote intent measure, the local intent, and the local intent measure to a local intent-join model. The local intent-join selects the best intent using the data. The local intent-join model may use ranks assigned to the intents. At step 470, method 400 includes selecting, using the local intent-join model, the remote intent as a final intent. At step 480, method 400 includes generating, a local result for the final intent using a local composition assistance model running on the client device. The result may be generated using a machine-learning model that receives the final intent as an input. The final intent may be used to select an entity from the user entity index that forms the result. At step 490, method 400 includes providing the local result to a user interface. The result may be provided as composition assistance that the user by adopt.

Turning initially to FIG. 5, a method 500 of generating results using local and remote resources is provided. At step 510, method 500 includes receiving a textual input at a client device, wherein the textual input is directed to a user interface. The textual input is provided to a user interface of an active application. The application context can include the state of the interface and/or the application. The application could be a local application running on the client or a remote application running on a server. In the case of a remote application, a client application, such as a browser, may generate the user interface.

At step 520, method 500 includes determining, using a local scenario router, that the textual input and context of the user interface satisfy a criteria indicating that a local machine-learning model can generate a response to the textual input.

At step 530, method 500 includes generating a local result and a local result measure for the textual input using the local machine-learning model running on the client device. At step 540, method 500 includes communicating the textual input to a remote machine-learning model running on a server. At step 550, method 500 includes receiving a remote result from the remote machine-learning model. At step 560, method 500 includes ranking, using a local ranking model, a first rank for the local result and a second rank for the remote result. At step 570, method 500 includes determining that the first rank is higher than the second rank. At step 580, method 500 includes as a result of the first rank being higher, providing the local result to the user interface.

Turning initially to FIG. 6, a method 600 of generating results using local and remote resources is provided. At step 610, method 600 includes receiving a textual input at a client device directed to a user interface.

At step 620, method 600 includes providing the textual input to a local intent model running on the client device, wherein the local intent model is trained to determine a user intent for a category of additional text. The textual input is provided to a user interface of an active application. The application context can include the state of the interface and/or the application. The application could be a local application running on the client or a remote application running on a server. In the case of a remote application, a client application, such as a browser, may generate the user interface.

At step 630, method 600 includes determining, based on the textual input and by the local intent model, a local intent and a local intent measure for the local intent. At step 640, method 600 includes determining, at the client device, that the local intent measure satisfies an intent threshold. At step 650, method 600 includes generating, a local result for the local intent using a local composition assistance model running on the client device. At step 660, method 600 includes communicating the textual input to a remote machine-learning model running on a server. At step 670, method 600 includes receiving a remote result from the remote machine-learning model.

At step 680, method 600 includes ranking, using a local ranking model, a first rank for the local result and a second rank for the remote result. At step 690, method 600 includes determining that the first rank is higher than the second rank. At step 695, method 600 includes as a result of the first rank being higher, providing the local result to the user interface.

Overview of Example Operating Environment

Having briefly described an overview of aspects of the technology described herein, an example operating environment in which aspects of the technology described herein may be implemented is described below in order to provide a general context for various aspects of the technology described herein.

Figure 7:
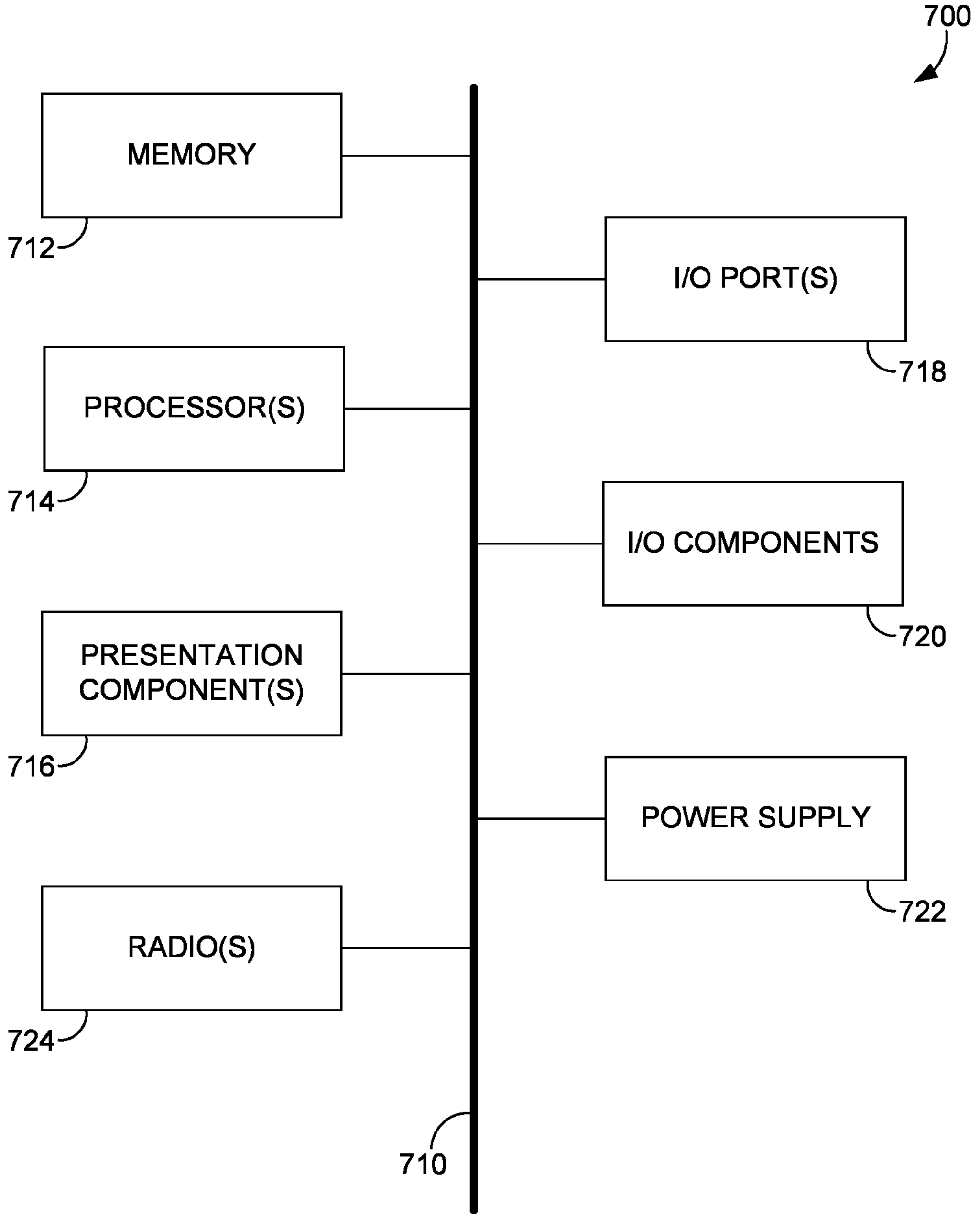
FIG. 7 is a block diagram of an example computing environment suitable for use in implementing aspects of the technology described herein.

Referring to the drawings in general, and to FIG. 7 in particular, an example operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an example computing device that may be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Example memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Example presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:

a processor; and computer storage memory having computer-executable instructions stored thereon which, when executed by the processor, configure the computing system to perform the steps of:

receiving a textual input at a client device;

providing the textual input to a local intent model running on the client device, wherein the local intent model is trained to determine a user intent for a category of additional text;

determining, based on the textual input and by the local intent model, a local intent and a local intent measure for the local intent;

communicating the textual input to a remote intent model running on a server;

receiving from the remote intent model a remote intent and a remote intent measure for the remote intent;

providing the remote intent, the remote intent measure, the local intent, and the local intent measure to a local intent-join model;

selecting, using the local intent-join model, the remote intent as a final intent;

generating, a local result for the remote intent using a local composition assistance model running on the client device; and providing the local result to a user interface.

2. The computing system of claim 1, wherein the steps further comprise generating a query from the textual input using the remote intent and providing the query to the local composition assistance model.

3. The computing system of claim 1, wherein the local result is an entity retrieved from a local user-specific entity index, wherein the local user-specific entity index includes entities associated with the user.

4. The computing system of claim 1, wherein the steps further comprise determining that the local intent measure does not satisfy a local-intent threshold and, in response, requesting the remote intent measure by communicating the textual input to the remote intent model.

5. The computing system of claim 1, wherein the steps further comprise determining that a local result measure associated with the local result satisfies a quality threshold and, in response, not requesting an additional result from a remote composition assistance model.

6. The computing system of claim 1, wherein the textual input is provided to a text composition interface associated with an active application running on the server.

7. The computing system of claim 1, wherein the steps further comprise:

determining that a measure associated with the local result does not satisfy a quality threshold;

in response, requesting an additional result from a remote composition assistance model;

receiving a remote result from the remote composition assistance model;

ranking, using a local ranking model, the local result and the remote result; and determining that the local result is associated with a higher rank.

8. The computing system of claim 7, wherein the remote composition assistance model accesses a tenant index while generating the remote result.

9. A computer-implemented method comprising:

receiving a textual input at a client device, wherein the textual input is directed to a user interface;

determining, using a local scenario router, that the textual input and context of the user interface satisfy a criteria indicating that a local machine-learning model can generate a response to the textual input;

generating a local result and a local result measure for the textual input using the local machine-learning model running on the client device;

determining that a local quality measure associated with the local result does not exceed a threshold quality measure;

in response, communicating the textual input to a remote machine-learning model running on a server to request a remote result;

receiving the remote result from the remote machine-learning model;

ranking, using a local ranking model, a first rank for the local result and a second rank for the remote result;

determining that the first rank is higher than the second rank; and as a result of the first rank being higher, providing the local result to the user interface.

10. The method of claim 9, wherein the context is a designated feature of the user interface associated with the textual input.

11. The method of claim 10, wherein the designated feature is an address box.

12. The method of claim 10, wherein the designated feature is a query box.

13. The method of claim 10, wherein the designated feature is a text composition box and the textual input includes a shortcut for entity autocomplete.

14. The method of claim 9, wherein the method further comprises communicating the context to the remote machine-learning model.

15. One or more computer storage media having computer-executable instructions embodied thereon that, when executed by one or more processors, cause the one or more processors to perform a method, the method comprising:

receiving a textual input at a client device directed to a user interface;

providing the textual input to a local intent model running on the client device, wherein the local intent model is trained to determine a user intent for a category of additional text;

determining, based on the textual input and by the local intent model, a local intent and a local intent measure for the local intent;

determining, at the client device, that the local intent measure satisfies an intent threshold;

generating, a local result for the local intent using a local composition assistance model running on the client device;

determining that a local quality measure associated with the local result does not exceed a threshold quality measure;

in response to the local result no exceeding the threshold quality measure, communicating the textual input to a remote machine-learning model running on a server;

receiving a remote result from the remote machine-learning model;

ranking, using a local ranking model, a first rank for the local result and a second rank for the remote result;

determining that the first rank is higher than the second rank; and as a result of the first rank being higher, providing the local result to the user interface.

16. The media of claim 15, wherein the user interface includes a text composition area.

17. The media of claim 15, wherein the local result is an entity retrieved from a local user-specific entity index, wherein the local user-specific entity index includes entities associated with the user.

18. The media of claim 15, wherein the remote result is an entity retrieved from a remote tenant entity index, wherein the remote tenant index includes entities associated an enterprise the user is associated with.

* * * * *